(No Model.) 3 Sheets—Sheet 1.

T. DARK, Sr.
GARBAGE CART.

No. 502,350. Patented Aug. 1, 1893.

(No Model.)

T. DARK, Sr.
GARBAGE CART.

No. 502,350.

Patented Aug. 1, 1893.

3 Sheets—Sheet 2.

Witnesses:
F. Gustav Wilhelm
F. C. Geyer

Thomas Dark Sr. Inventor.
By Wilhelm & Bonner
Attorneys.

(No Model.) 3 Sheets—Sheet 3.
T. DARK, Sr.
GARBAGE CART.
No. 502,350. Patented Aug. 1, 1893.
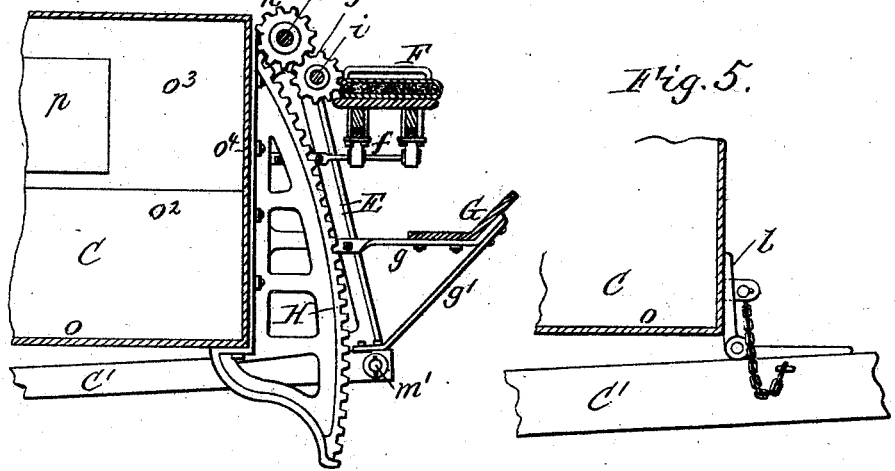
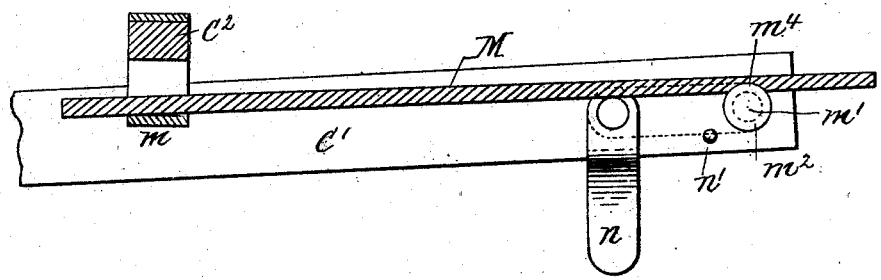
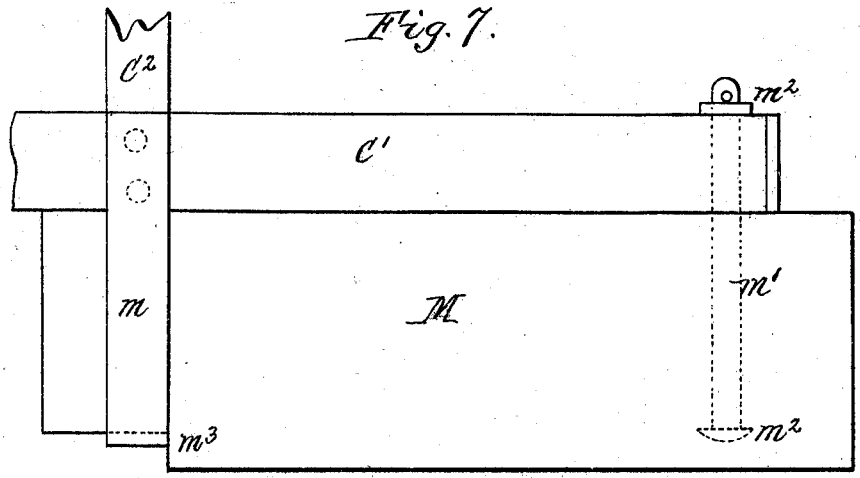

UNITED STATES PATENT OFFICE.

THOMAS DARK, SR., OF BUFFALO, NEW YORK.

GARBAGE-CART.

SPECIFICATION forming part of Letters Patent No. 502,350, dated August 1, 1893.

Application filed April 13, 1893. Serial No. 470,178. (No model.)

*To all whom it may concern:*

Be it known that I, THOMAS DARK, Sr., a citizen of the United States, residing at Buffalo, in the county of Erie and State of New York, have invented new and useful Improvements in Garbage-Carts, of which the following is a specification.

This invention relates to a cart for collecting the household garbage in cities.

One of the objects of my invention is to produce a dumping cart of simple construction which effectually confines the garbage during transportation, so that leakage of liquid and escape of effluvia are prevented, rendering the collection of such material much less offensive.

The invention has the further object to so organize the cart that the same can be conveniently dumped by the driver without alighting from the cart.

Figure 1:
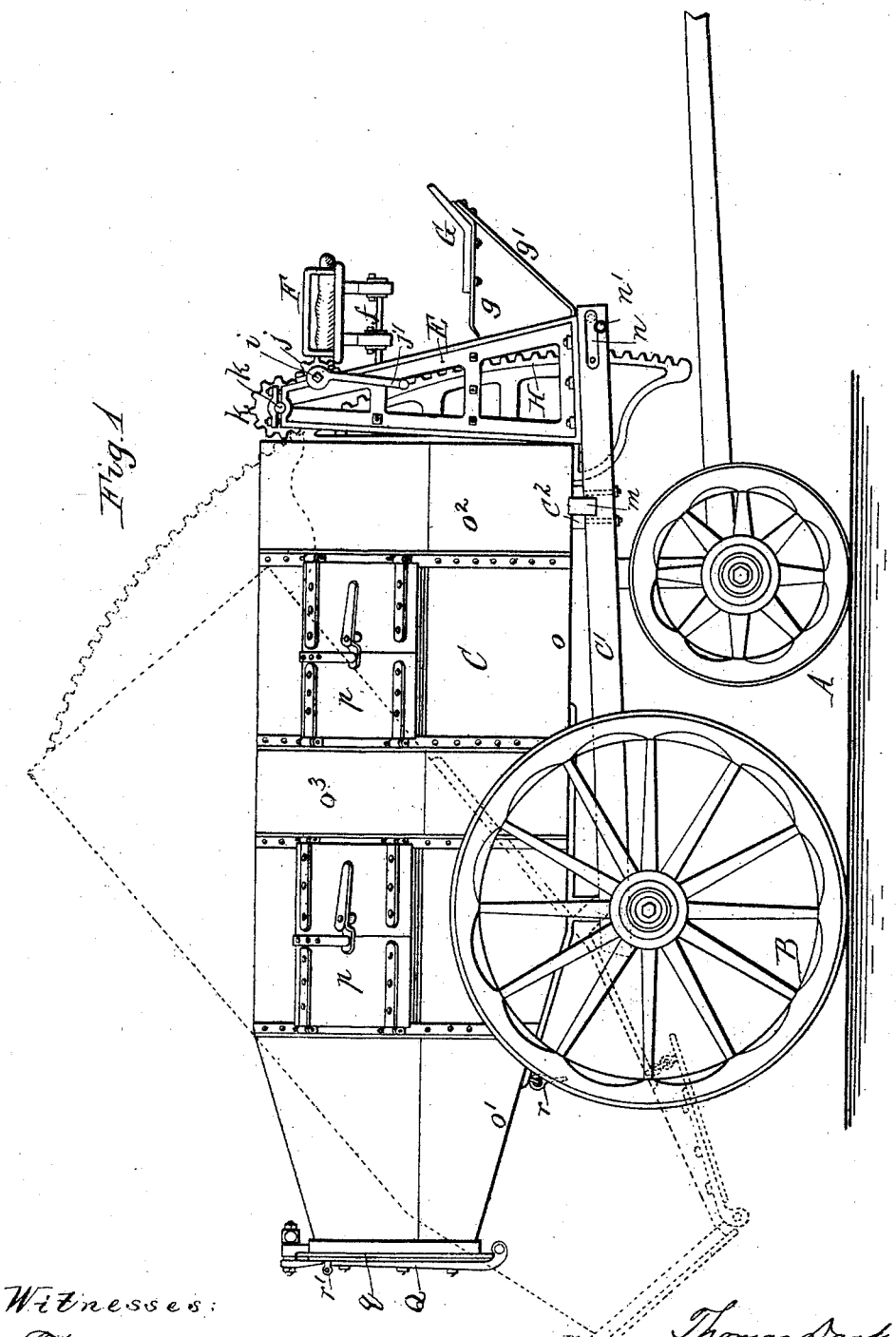
Figure 2:
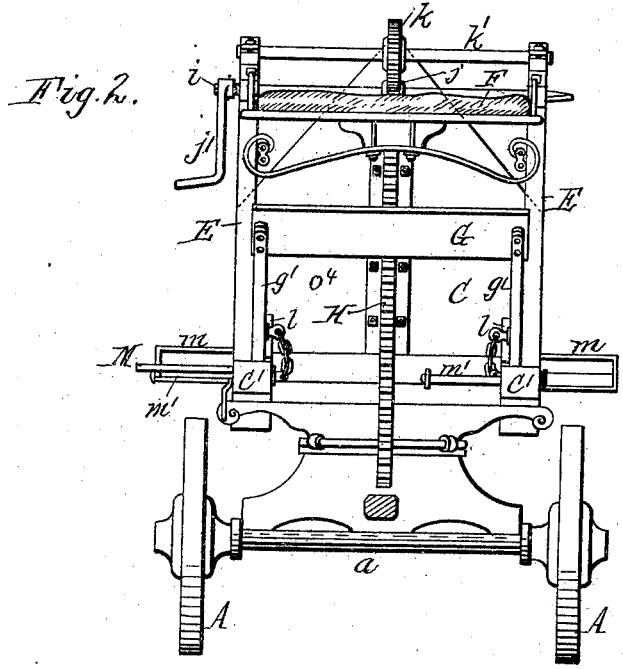
Figure 3:
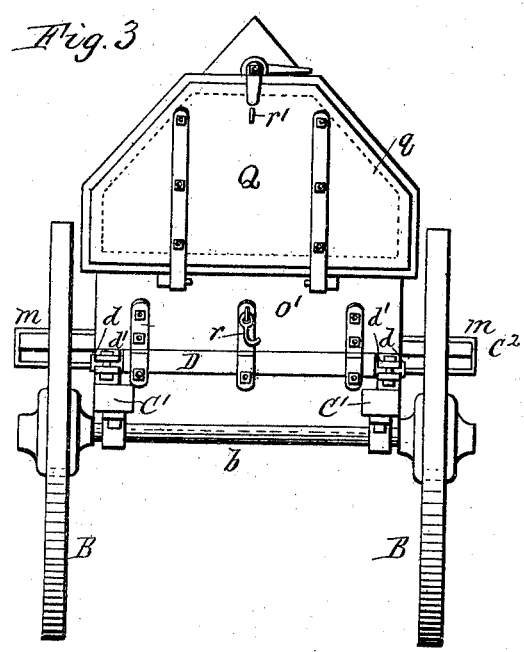

In the accompanying drawings consisting of three sheets:—Figure 1 is a side elevation of my improved garbage cart. Fig. 2 is a front view thereof. Fig. 3 is a rear view of the same. Fig. 4 is a vertical longitudinal section of the front portion of the cart with the running gear omitted. Fig. 5 is a similar view, on an enlarged scale, showing the means for holding the tilting body in its normal position. Fig. 6 is a vertical longitudinal section, on an enlarged scale, of the side platform of the cart. Fig. 7 is a top plan view of the side platform and the adjacent portion of the draft frame.

Like letters of reference refer to like parts in the several figures.

$a$ is the front axle of the cart, A the wheels mounted thereon, $b$ the rear axle and B the rear wheels.

C is the body forming the garbage receptacle, which is capable of dumping rearwardly for discharging its contents, and which is supported upon a frame consisting of longitudinal beams $C'$ $C'$ and a front cross piece $C^2$. These beams are secured at their front portions to a bolster mounted upon the front axle and at their rear ends to the rear axle.

D is a transverse bar secured to the under side of the receptacle, near the middle thereof, and provided at its ends with trunnions $d$ which are journaled in bearings $d'$ secured to the rear portions of the longitudinal beams $C'$.

E represents an upright supporting frame, independent of the body C arranged in front of the latter, for supporting the dumping mechanism of the body and the driver's seat F and foot board G. This frame consists of two standards secured at their lower ends to the longitudinal beams $C'$.

H is an upright gear segment secured centrally to the front end of the dumping receptacle.

$i$ is a transverse driving shaft arranged in front of the receptacle and journaled in bearings secured to the upper portions of the standards E. This shaft is provided with a gear wheel $j$ and its ends are made square to receive a detachable hand crank $j'$ for turning the shaft.

$k$ is an idler pinion meshing with the gear wheel $j$ and the gear segment H and mounted on a transverse shaft $k'$ turning in bearings at the upper ends of the standards. Upon turning the hand crank rearwardly, the gear segment is moved upwardly causing the receptacle to tilt rearwardly on its trunnions, and upon turning the crank in the opposite direction the receptacle is returned to its normal horizontal position. The body or receptacle is held in position for receiving the garbage by hasps $l$ hinged to the beams $C'$ near opposite sides of the front portion of the body and interlocked with eyes secured to the latter.

M is a support or platform which is adapted to be arranged on either side of the cart below the adjacent end of the driving shaft $i$ and upon which the driver stands in turning the hand crank for dumping and righting the receptacle. This platform consists of a removable board supported at its rear portion in a horizontal strap or loop $m$ secured to the under side of the projecting end portion of the front cross bar $C^2$. The front portion of the platform is supported upon a horizontal rod $m'$ which is arranged loosely in a transverse opening formed in the adjacent portion of the beam $C'$, so that the rod may be drawn outwardly to the projecting position shown in the right hand side of Fig. 2, for supporting the board, or pushed inwardly to the position shown on the left hand side of the same figure, so as to be out of the way. A loop $m$ and a supporting rod $m'$ are arranged on each side of the cart as shown, so that the platform may be supported on either side of the cart. Each of these supporting rods is provided at both ends with heads or stops $m^2$ which prevent withdrawal of the rod from its opening. The rear portion of the platform is contracted to fit into its supporting strap, as shown in Fig. 7, and the shoulder $m^3$ formed by this contracted portion bears against the outer bar of the loop, preventing rearward displacement of the platform. The latter is held against forward displacement by the outer head of the supporting rod, which engages in a recess $m^4$ formed in the under side of the platform. Upon lifting the platform sufficiently to allow its recess to clear this head, the rear portion of the platform may be withdrawn from its loop, thus detaching the same from the cart. After removing the platform, the projecting supporting rod $m'$ is pushed inwardly out of the way.

$n$ represents turn buttons pivoted to the outer sides of the beams $C'$ adjacent to the sliding supporting rods $m'$ and adapted to be swung over the outer heads of the rods when the same are retracted, so as to reliably retain them in this position.

$n'$ are stops arranged on the outer sides of the beams $C'$ in front of the pivots of the turn buttons, whereby the latter are prevented from falling below the heads of the supporting rods $m'$. The platform, when not in use, may be carried in some convenient place on the cart or may be kept at the garbage crematory or other place where the garbage is dumped.

The seat F is supported by forwardly extending arms $f$ secured to the standards E, as shown in Figs. 1 and 4, and the foot board G is supported by similar arms $g$ and inclined braces $g'$ secured at their upper ends to the outer portion of the foot board and at their lower ends to beams $C'$. By supporting the seat and the foot board upon the stationary frame E, instead of upon the tilting body, the seat may be placed low enough to be conveniently mounted without requiring the front portion of the body to be recessed and reduced in capacity. The body consists of a bottom composed of a horizontal front portion $o$ and an oblique rear portion $o'$, vertical side walls $o^2$, a roof shaped top $o^3$ and a front wall $o^4$. These walls are constructed of steel, galvanized iron or other suitable material and are tightly secured together. The roof shaped top slopes from its ridge toward both side walls and toward the rear, and is provided in each of its walls with openings for the introduction of the material, which are tightly closed by doors $p$.

$q$ is the discharge opening arranged in the rear end of the body and tightly closed by a door Q which is locked by a turn button as shown. The oblique rear portion of the bottom $o'$ extends upwardly and rearwardly from the rear end of the horizontal portion of the bottom to the discharge opening, which latter is bounded by the rear ends of said oblique portion, the side walls of the body and the roof shaped top. By this construction the body is tapered rearwardly in the form of a hopper, which causes the ready and complete discharge of the material when the cart is dumped. The oblique rear portion of the bottom rises to such a height above its front portion that the lower edge of the discharge opening of the body is above the level of the volume of liquid which is mixed with the garbage and collects in the bottom of the body, so that when the body is in its horizontal position, the liquid level is below the discharge opening and the liquid is confined even if the discharge door does not fit perfectly tight. This prevents leakage of the liquid, as the permanent joints of the body are easily made tight, while the discharge door cannot be kept water tight under the rough usage which such carts receive. The discharge door, when open, is preferably swung rearwardly and upwardly under the oblique portion of the bottom of the body to allow the body to be properly tilted and it is supported in this position by a hook $r$ attached to the under side of the body and engaging with an eye $r'$ secured to the outer side of the discharge door. By arranging the discharge opening in an upright position, as shown, the same is comparatively low and the contents of the body are completely discharged with a smaller tilting movememt and without requiring a portion of the contents to be removed with a shovel. As the body is tight on all sides and its receiving and discharge openings are closed by doors which tightly fit their seats, the gases from the garbage are effectually confined.

I claim as my invention—

1. The combination with the draft frame, of a body pivoted upon the same and composed of a tight front, sides, top and bottom, forming a tight inclosure, and having in its top inlet openings provided with doors, its rear end being formed with an upright discharge opening provided with a door, and with a bottom descending forwardly from said discharge opening, substantially as set forth 2. The combination with the draft frame, of a tilting body pivoted upon the draft frame and provided with a tight front and sides, an upright discharge opening at its rear end, a tight bottom having its rear portion inclined upwardly toward the rear discharge opening, a top sloping toward both sides and having a receiving opening in each side and doors applied to said openings, and a gear segment secured to the front end of said body, stationary standards secured to the draft frame in front of said body and supporting a seat and foot board, and a crank shaft journaled in said standards and provided with a gear pinion engaging with the gear segment on the body, substantially as set forth.

3. The combination with the draft frame, of a tilting body mounted on the draft frame, a stationary frame arranged on the draft frame in front of the body, a driving shaft supported on said stationary frame, supports arranged on opposite sides of the cart below the end portions of the driving shaft, and a removable platform adapted to be placed upon either of such supports, substantially as set forth.

4. The combination with the draft frame, of a tilting body mounted on the draft frame, a driving shaft supported on the draft frame in front of the body, a removable platform adapted to be placed on either side of the cart below the end portion of said shaft, loops arranged on the draft frame on opposite sides of the cart for supporting one end of such platform, and retractible supports for the opposite end of such platform, substantially as set forth.

5. The combination with the draft frame, of a tilting body mounted on the draft frame, a driving shaft supported on the draft frame in front of the body, supporting loops secured to the draft frame on opposite sides of the body, retractible supporting rods arranged in front of such loops and sliding in transverse openings in the draft frame, and a platform arranged with its rear portion in one of said loops and resting with its front portion upon the adjacent rod, substantially as set forth.

6. The combination with the draft frame, of a tilting body mounted on the draft frame, a driving shaft supported on the draft frame in front of the body, supporting loops secured to the draft frame on opposite sides of the body, retractible supporting rods arranged in front of such loops, and a platform provided near its rear end with shoulders which bear against said loop and provided near its front end with a recess which receives the headed outer ends of said supporting rod, substantially as set forth.

Witness my hand this 8th day of April, 1893.

THOMAS DARK, Sr.

Witnesses:
CARL F. GEYER,
F. C. GEYER.